Aug. 23, 1955    P. M. BAKER    2,716,066
CAKE PROTECTOR AND PRESERVER
Filed June 10, 1952
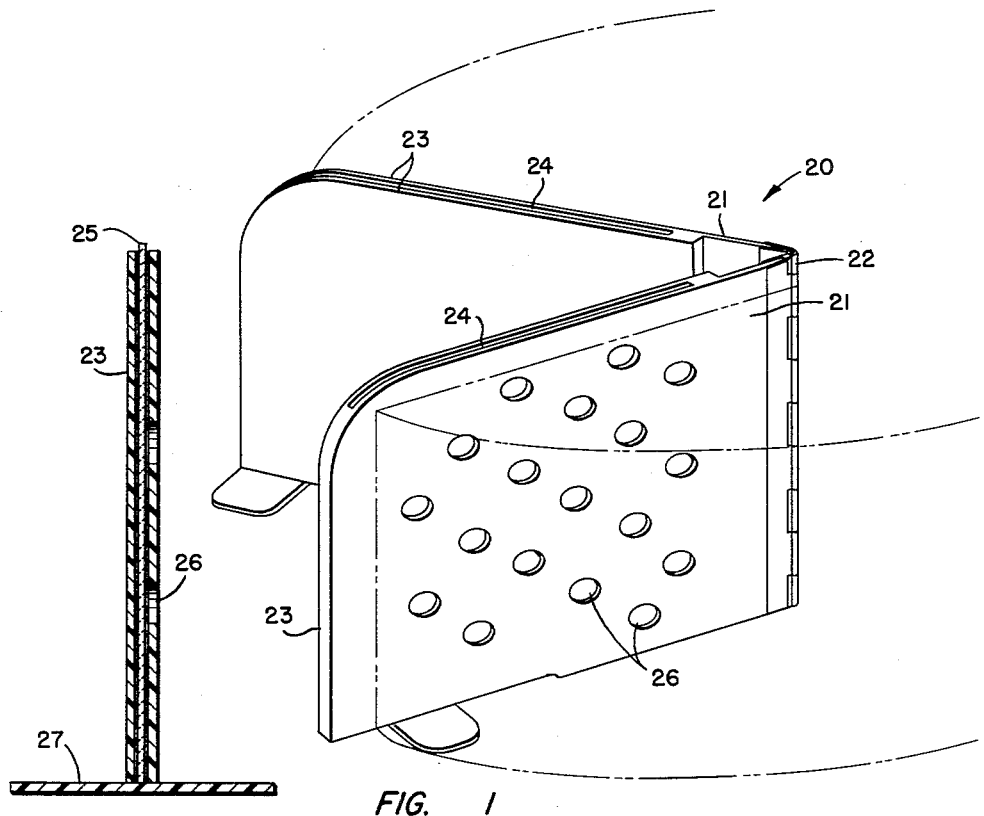
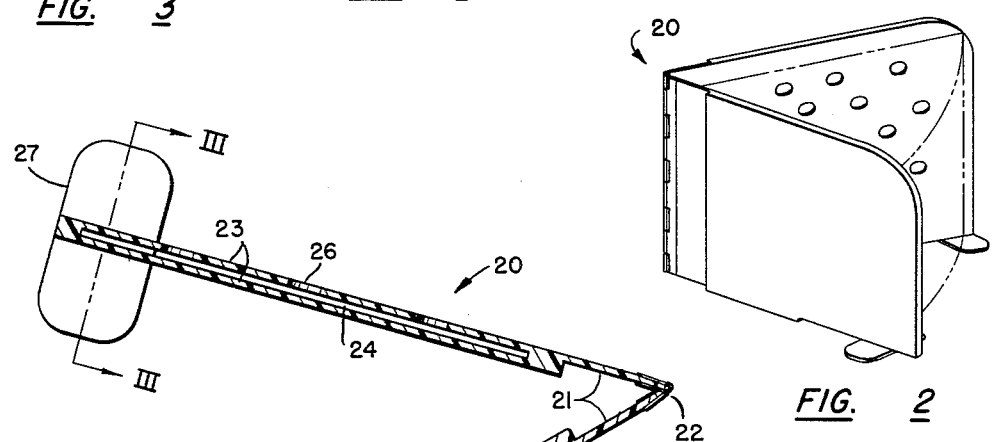
INVENTOR.
PAUL M. BAKER
BY
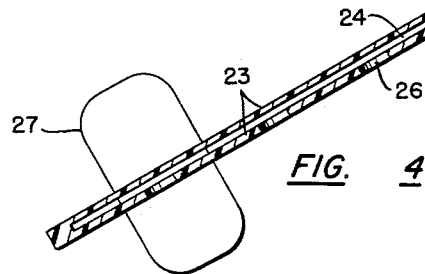
attorney

United States Patent Office 2,716,066
Patented Aug. 23, 1955

2,716,066

CAKE PROTECTOR AND PRESERVER

Paul M. Baker, Columbus, Ohio

Application June 10, 1952, Serial No. 292,711

7 Claims. (Cl. 99—234)

This invention relates generally to culinary equipment and is more particularly directed to a device for protecting and preserving articles of food having rounded or cylindrical forms and from which wedge-shaped segments may be removed. One example of such an article of food is a cake.

An object of this invention is to provide a cake protector and preserver having a pair of sections connected by a hinge and being provided with means for retaining moisture in or even imparting moisture to the cake.

Another object of this invention is to provide a cake protector and preserver with hinged sections having pockets for receiving absorbent pads to which moisture may be applied, the sections having openings in the cake engaging surfaces so that moisture from the pads may intimately contact the exposed surfaces of the cake and prevent drying or other deterioration of the cake.

A further object of this invention is to provide a cake protector and preserver with a pair of plate-like sections hinged together at one end and provided with foot elements which project laterally on either side of said sections to hold the same upright adjacent the exposed face of a cake from which a piece has been cut, the foot elements on the sections being offset with respect to one another to avoid interference when the sections are moved toward each other.

Further objects and advantages of the present invention will be apparent from the following description, reference being had to the accompanying drawings wherein a preferred form of embodiment of the invention is clearly shown.

In the drawings:

Fig. 1 is a perspective view showing a cake protector and preserver formed in accordance with the invention in operative position with respect to a cake from which a piece has been cut.

Fig. 2 is a similar view showing the device in operative position with respect to a cake, only a small portion of which remains.

Fig. 3 is a vertical sectional view taken through one section of the device to show a pad-receiving pocket therein and a supporting foot element formed therewith.

Fig. 4 is a horizontal sectional view taken through the device.

Referring more particularly to the drawing, the numeral 20 indicates the cake protector and preserver forming the subject matter of the invention. The device is shown in two operative positions in Figs. 1 and 2, the first figure showing the cake with a small wedge-shaped section removed and the other figure showing only a small wedge-shaped section of the cake remaining. It will be noted that the device may be used to protect portions of a cake of any size with equal facility.

The cake protector 20, as shown in the drawings, comprises two plate-like or wing sections 21 which are hinged together as at 22 along one edge of each section. The sections 21 are each formed with wall sections 23 which are spaced to provide pockets 24. A pad or sheet 25 of blotting or other absorbent material is removably positioned in each pocket 24, the latter opening toward the top whereby the pads 25 may be readily inserted and removed.

The wall of each section adapted to engage the exposed surface of the cake is provided with a plurality of holes 26 so that moisture with which the pads 25 are impregnated before use may be imparted to such exposed cake surfaces to retard the drying thereof. The number and size of such holes and the dimensions of the pockets are not critical and may be varied according to the desires of the manufacturer, however, the pockets should be large enough to extend substantially across the exposed surfaces of the cake and the holes sufficient in size and number to insure the successful operation of the device.

When the device is used, it is positioned adjacent the exposed surface of the cake with the perforated walls substantially in contact therewith. The device will remain in upright position because of the feet 27 extending on both sides of the sections 21. The feet on one section are offset with relation to those of the other section so that, when the sections are arranged either back to back or face to face, the feet will not interfere with one another. These feet may be either molded integrally with the section 21 or secured thereto after molding. The sections may also be formed by molding or they may be fabricated from sheet material suitably secured together.

Any desired material may be utilized in the manufacture of the cake protector 20 but a transparent plastic has been found particularly desirable since it permits the observation of informative indicia provided on the surface of the pads 25.

While the form of embodiment of the present invention as herein disclosed constitutes a preferred form, it is to be understood that other forms might be adopted, all coming within the scope of the claims which follow.

I claim:

1. A cake protector comprising a pair of hingedly connected plate-like sections, each of which has inner and outer walls spaced to provide a pocket, one of said walls having openings extending therethrough; and an absorbent sheet disposed in said pocket, said sheet being replaceable.

2. A cake protector comprising a pair of hingedly connected plate-like sections, each of which has inner and outer walls spaced to provide a pocket, one of said walls having openings extending therethrough; an absorbent sheet disposed in said pocket; and a foot element on each of said plate-like sections.

3. A cake protector comprising a pair of hingedly connected plate-like sections, each of which has inner and outer walls spaced to provide a pocket, one of said walls having openings extending therethrough; an absorbent sheet disposed in said pocket; and a foot element projecting from either side of each of said plate-like sections.

4. A cake protector comprising a pair of hingedly connected plate-like sections, each of which has inner and outer walls spaced to provide a pocket, one of said walls having openings extending therethrough; an absorbent sheet disposed in said pocket; and a foot element projecting from either side of each of said plate-like sections, the foot element on one of said sections being disposed at a different distance from the hinge connection than the foot element on the other section.

5. A cake protector comprising a pair of plate-like sections, each section having inner and outer walls spaced to provide a pocket, one of said walls having openings formed therein and the other being imperforate; and hinge means connecting said sections.

6. A cake protector comprising a pair of sections with interfitting edges hingedly uniting the sections, each section having spaced parallel walls joined along the hinged edge, the opposite edges and bottom edges to provide a pocket, one of said walls having perforations formed therein; and a foot element projecting substantially at right angles from one of said walls.

7. A cake protector comprising a pair of sections with interfitting edges hingedly uniting said sections, each section having spaced substantially rectangular walls joined along their hinged bottom and another pair of edges to provide a pocket to removably receive a moisture absorbent sheet, one of said walls being imperforate and the other having perforations, the latter wall serving to space the absorbent sheet from the cake and provide circulation therebetween, the sections being relatively swingable about the hinged edges to selectively position the perforated walls adjacent two cut surfaces of a cake disposed at acute, straight and obtuse angles relative to one another.

References Cited in the file of this patent

UNITED STATES PATENTS

| | | |
|---|---|---|
| 611,113 | Field | Sept. 20, 1898 |
| 1,590,704 | Semelroth | June 29, 1926 |
| 1,661,003 | Miller | Feb. 28, 1928 |
| 1,712,858 | Tsuchi | May 14, 1929 |
| 2,528,233 | Kubricht | Oct. 31, 1950 |
| 2,617,350 | Shol | Nov. 11, 1952 |